United States Patent [19]

Balhorn

[11] Patent Number: 4,548,195

[45] Date of Patent: Oct. 22, 1985

[54] SOLAR ENERGY APPARATUS WITH AUTOMATIC TRACKING ALIGNMENT ADJUSTMENTS

[76] Inventor: Alan C. Balhorn, 105 Hidden Meadow Rd., Apple Valley, Minn. 55124

[21] Appl. No.: 565,729

[22] Filed: Dec. 27, 1983

[51] Int. Cl.[4] .............................................. F24J 3/02
[52] U.S. Cl. ................................... 126/424; 126/438; 126/452
[58] Field of Search ............... 126/424, 438, 439, 452; 350/288, 289, 293, 299, 303, 320; 364/516, 900, 460

[56] References Cited

U.S. PATENT DOCUMENTS

| 4,215,410 | 7/1980 | Weslow et al. | 126/424 X |
| 4,261,335 | 4/1981 | Balhorn | 126/438 |
| 4,432,343 | 2/1984 | Riise et al. | 126/424 |

Primary Examiner—Larry Jones
Attorney, Agent, or Firm—Kinney & Lange

[57] ABSTRACT

Automatic alignment adjustments are incorporated into the tracking control program of a concentrating solar collector apparatus to skew the alignment of aspheric, nonparabolic reflectors slightly off the half angle between the sun and fixed receivers. The automatic alignment adjustments are predetermined for each day of the year specific to the latitude of the installation and provide flexibility in the location of the reflector's pivot axes and in the design of the reflector's support framing system, reduce tracking error efficiency losses, and allow replicated reflectors and standardized support framing systems to be utilized over a wide range of latitudes.

8 Claims, 9 Drawing Figures

PRIOR ART

FIGURE 1

PRIOR ART

SOLAR ENERGY APPARATUS WITH AUTOMATIC TRACKING ALIGNMENT ADJUSTMENTS

BACKGROUND OF THE INVENTION

1. Field of the Invention

The present invention relates to solar energy apparatus, in which solar radiation is collected and converted to another form of energy.

2. Description of the Prior Art

The solar energy apparatus described in my previous U.S. Pat. No. 4,261,335 utilizes aspheric, nonparabolic reflectors that pivot in two directions and focus reflected solar radiation to fixed receivers positioned in front of the reflectors. The receivers may be optical waveguides as described in the patent, or other means of receiving, converting, and transmitting the collected energy to a means of use or storage at a higher temperature.

The solar energy apparatus described in U.S. Pat. No. 4,261,335 provides many improvements and advantages over other solar collector apparatus, but has efficiency, design, and fabrication limitations. First, the location of the reflector's pivot axes is a function of the arc of travel of the edges of the reflector which limits the design flexibility of the reflector subframe system. Second, shading of the retreating reflector segments by the adjacent reflectors reduces the overall pattern size of the reflected energy by design, but also reduces the effective reflector aperture and the system's efficiency. Third, the pivot axes locations proximate the reflector's surface do not reduce the effects of tracking errors. Fourth, the curvature design is specific to each latitude of installation and the use of replicated reflectors at different latitudes results in decreased efficiencies. Alternatively, the design and fabrication of nonreplicated reflectors would increase the initial cost of the solar apparatus and reduce its economic advantages.

SUMMARY OF THE INVENTION

In the present invention, automatic alignment adjustments are incorporated into the tracking control program of aspheric, nonparabolic concentrating solar collector apparatus. The automatic alignment adjustments are predetermined for each day of the year, specific to the latitude of the solar collector's installation, and skew the alignment of the reflectors slightly off the half angle between the sun and the fixed receivers.

The present invention preferably includes control means which controls movement of the reflectors to maintain a desired alignment of the focal axes of reflectors. The control means periodically computes a current position of the sun based upon latitude of the installation, current day of the year and current solar time. The control means computes a skew factor as a function of the current day of year and an angle between the current position of the sun and vertical. The control means uses the skew factor and a half angle derived from the current position of the sun to determine the desired alignment of the focal axes.

An improved embodiment can be achieved with the automatic alignment adjustments of the present invention that includes a plurality of aspheric, nonparabolic reflectors arranged in tandem pairs and controlled by tracking means in two directions to reflect and concentrate solar radiation to receivers located above and proximate the centerline between the reflectors in each tandem pair. The receivers include secondary compound parabolic concentrators that further concentrate the reflected solar radiation and convert the concentrated radiation to heat that is distributed to a point of use or storage by a heat transfer means.

In the improved embodiment of the present invention, the alignment adjustments provide flexibility in the location of the reflector's pivot axes and in the design of the reflector's support framing system, offset the effects of tracking errors thereby reducing tracking error efficiency losses, and allow replicated reflector curvatures and standardized support framing systems to be utilized over a wide range of latitudes.

DETAILED DESCRIPTION OF THE PREFERRED EMBODIMENTS

1. Prior Aspheric, Nonparabolic Concentrating Reflectors

The curvature of the aspheric, nonparabolic reflectors described in my previous U.S. Pat. No. 4,261,335 is a selected curvature which causes a total traversed pattern of reflected solar radiation from each point on the reflector's surface to be essentially centered on the respective, fixed receivers over all hours of the day and year. The reflectors are pivoted in two directions about pivot axes located forward of and proximate to the reflector's surface, and are aligned by tracking means at precisely the half angle between the sun and the fixed receivers.

Figure 1:
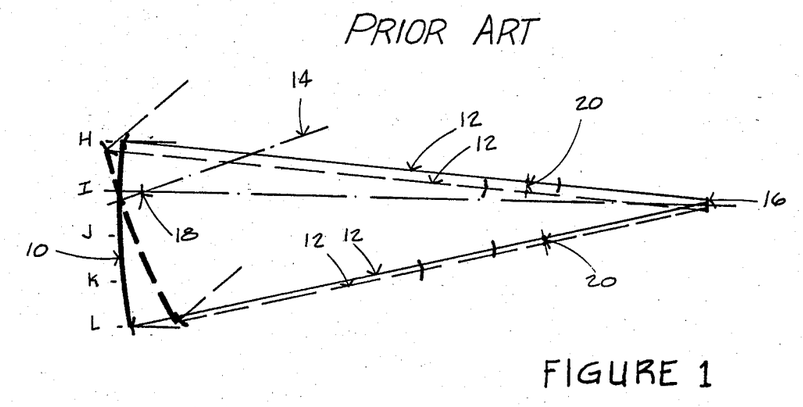
FIG. 1 is a diagrammatic illustration of the reflected rays of solar radiation by an aspheric, nonparabolic reflector for the vertical section of the solar apparatus of U.S. Pat. No. 4,261,335 with the pivot axis forward of the reflector surface.

FIG. 1 illustrates in vertical section the preferred embodiment of the invention of my U.S. Pat. No. 4,261,335 wherein the advancing segment, I to L, of the reflector 10 is considerably wider than the retreating segment, H to I, and wherein the reflected rays 12 remain parallel as long as the reflector's focal axis 14 is positioned at precisely the half angle between the sun and the receiver 16. The reflector's pivot axis 18 is positioned forward of and proximate to the reflector 10 such that the rise 20 of the arc of travel of the edges of the reflector 10 is minimized which results in a minimum width of the pattern of reflected rays 12 at the receiver 16.

Figure 2:
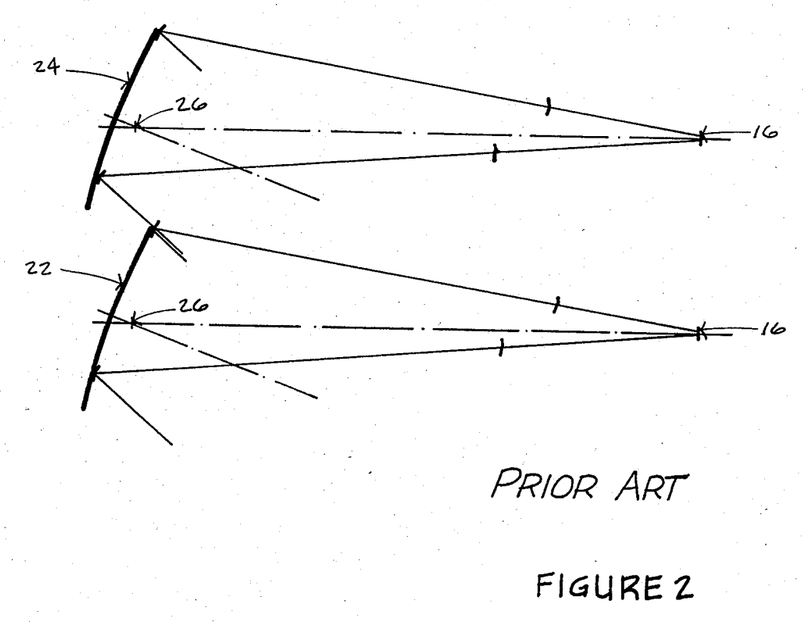
FIG. 2 is a diagrammatic illustration of adjacent reflectors of the solar apparatus of U.S. Pat. No. 4,261,335 and the resultant shading of adjacent reflectors at large angles between the sun and the receiver.

FIG. 2 illustrates in plane section the preferred embodiment of the aspheric, nonparabolic reflectors of my U.S. Pat. No. 4,261,335 wherein the advancing segment of reflector 22 shades the retreating segment of the adjacent reflector 24, thereby creating a similar, reduced effective width of reflector segment in the horizontal section as provided in the vertical section as illustrated in FIG. 1. Similarly, the reflectors 22 and 24 are pivoted about pivot axes 26 positioned forward of and proximate to the reflectors' surface such that the size of the pattern of the reflected rays at the receivers 16 is minimized.

The preferred embodiment of the prior art achieves a minimum pattern size at the receiver, but incurs considerable loss of reflector utility because of the intentional shading of adjacent reflectors. In addition, the imbalanced reflector profile and the restrictive pivot axes locations present difficulties in the design and fabrication of the reflector support framing system.

2. The Apparatus of the Present Invention

The present invention allows changes that do not depart from the spirit and scope of my previous invention, but that enhance the performance of the solar energy apparatus and simplify its design and fabrication. One improved embodiment, as illustrated in FIG. 3, supports the reflectors in a torsion tube support frame and focuses two reflectors to each receiver to increase the concentration ratio of the solar apparatus.

Figure 3:
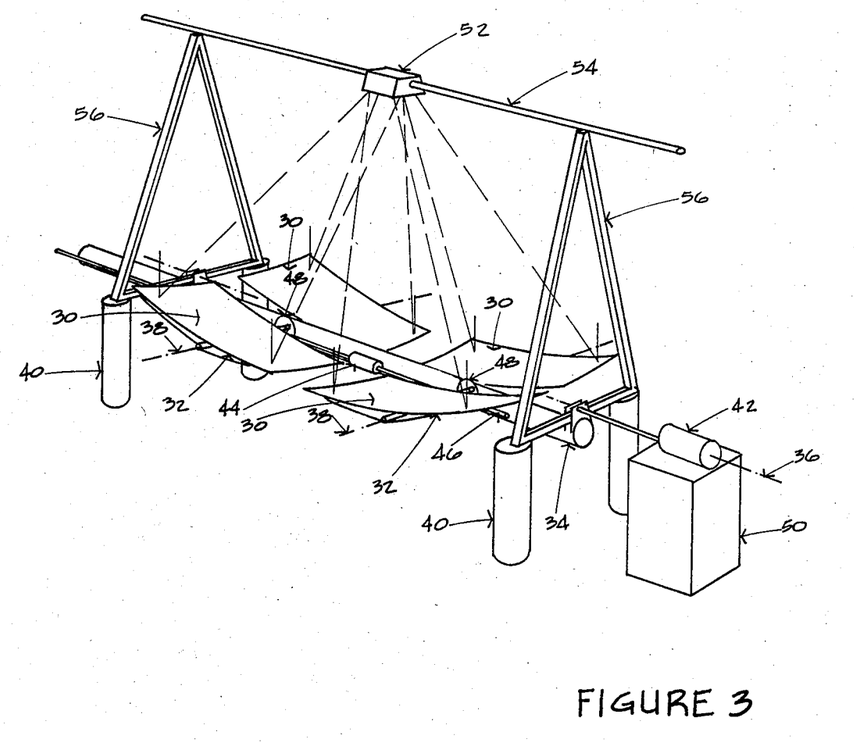
FIG. 3 is a fragmentary perspective illustration of an improved, preferred embodiment of the solar apparatus as allowed by the improvements of the present invention.

As illustrated in FIG. 3, reflectors 30 are split and mounted on a reflector support frame 32 that is in turn mounted on a torsion tube support frame 34. The torsion tube 34 is aligned north-south and pivots about a north-south pivot axis 36. Multiple, tandem pairs of aspheric, nonparabolic reflectors 30 are mounted to each torsion tube 34, that are in turn aligned in parallel rows. Each reflector 30 is pivoted about a second pivot axis 38 aligned perpendicular to the north-south pivot axis 36. The mounting of the reflector support frame 32 to the torsion tube support frame 34 allows multiple reflectors 30 to be rotated a full 360° about perpendicular pivot axes 38 for tracking and for stowing of the reflectors 30 in an inverted position at night or during damaging weather.

The torsion tube 34 is supported by supports 40 that are fixed to the ground or to the roof of a structure. The torsion tube 34 is rotated about the north-south pivot axis 36 by a first tracking/drive means 42. The reflectors 30 and reflector support frames 32 are rotated about the perpendicular pivot axes 38 by a second tracking/drive means 44 mounted to and pivoting with the reflector support frame 32. All of the tandem pairs of reflectors 30 and reflector support frames 32 affixed to one torsion tube 34 are rotated about their perpendicular pivot axes 38 by second tracking/drive means 4 through a shaft and primary worm gear assembly 46 mounted to the torsion tube 34, and secondary gears 48 mounted to each reflector support frame 32.

The tracking/drive means 42 and 44 are actuated by control means 50 that includes a microcomputer that periodically calculates the position of the sun, incorporates the automatic alignment adjustments of the present invention, and transmits electrical signals to the electric motors of the tracking/drive means 42 and 44. This type of control means is a closed loop system which does not depend upon sensing of the sun's position, but rather calculates the sun's position. Binary encoders are incorporated into the tracking/drive means 42 and 44 to provide feedback of the reflector's position to the microcomputer of control means 50.

The tandem reflectors 30 focus reflected solar energy to receivers 52 mounted along the length of heat transfer means 54 proximate the midpoint between each pair of tandem reflectors 30. The receivers 52 are compound parabolic concentrators (CPC) mounted around and parallel to the piping of the heat transfer means 54. The compound parabolic concentrators further concentrate the approximately square pattern of reflected solar energy at the receivers 52 to a line focus pattern along a short length of the piping of the heat transfer means 54. In combination, the tandem reflectors 30 and the compound parabolic concentrators of the receivers 52 provide a significantly higher concentration ratio (in the 300 to 1 range) which is beneficial to applications requiring high operating temperatures.

The heat transfer means 54 and the receivers 52 are supported by supports 56 mounted to the torsion tube supports 40. The heat transfer means 54 is fixed without any expensive, flexible connections and includes headers, fluid medium, throttling valves, pumps, insulation, absorptive coatings and other devices and materials customary and required to receive, absorb and transfer the concentrated and collected solar energy to a point of use or storage.

In a preferred embodiment of the present invention, the automatic alignment adjustments provided by control means 50 introduce a skew factor which causes the alignment of the focal axes of reflectors 30 to be skewed slightly from the precise alignment with the half angle between the sun and the corresponding receiver 52. This skew factor is a function of the current day of year and the angle between the current position of the sun and a vertical axis. The control means, which preferably includes a micro-computer, periodically computes the current position of the sun based upon the latitude of the installation, the current day of the year, and the current solar time. Based upon a half angle derived from the current position of the sun and the skew factor, control means 50 determines the desired alignment of the focal axis. Control means 50 provides the control signals to first tracking-drive means 42 and second tracking-drive means 44 to move reflectors 30 to the desired alignment (which incorporates the automatic alignment adjustments of the present invention).

To appreciate fully the advantages of the automatic alignment adjustments of the present invention, it is beneficial to first establish the effects of the pivot axes location and tracking alignment errors on the pattern of reflected rays for reflectors that pivot independently of truly fixed receivers.

Figure 4:
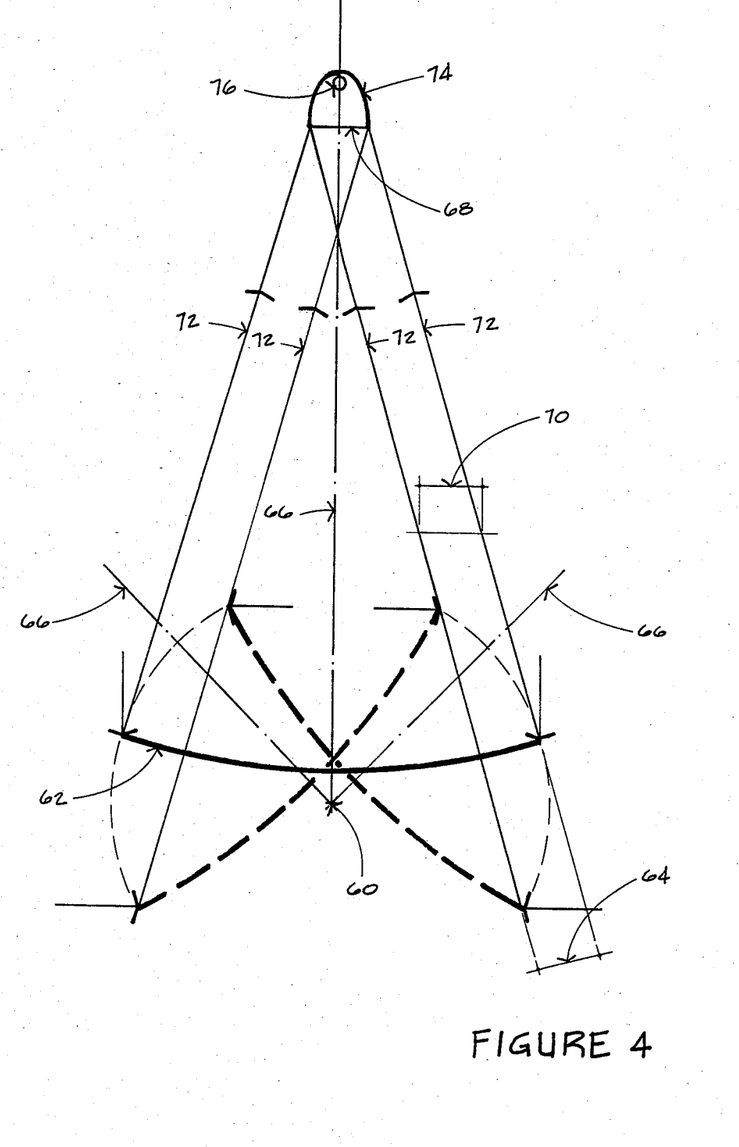
FIG. 4 is a diagrammatic illustration of the location of the pivot axis of an aspheric, nonparabolic reflector as a function of the arc of travel of the reflector's edge.

In the embodiment illustrated in FIGS. 1 and 2, the effective width of the advancing segment of the reflector is wider than the retreating segment to minimize the width of the pattern of reflected rays at the receiver which, as noted in the Description of the Prior Art, reduces the utility of the total reflector aperture. When the full aperture of the reflectors is utilized and the effective width of the advancing and retreating reflector segments are equal, FIG. 4 illustrates that a pivot axis 60 located rearward of a reflector's 62 surface minimizes a rise 64 of the arc of travel of the edge of the reflector 62 as the reflector 62 is rotated from left to center to right, with a reflector focal axis 66 positioned at precisely the half angle between the sun and a fixed receiver 68. A width 70 of the pattern of reflected rays 72 at the receiver 68 is considerably wider than in the prior art, as is allowed by the incorporation of compound parabolic collectors 74 at the receivers 68 that further concentrate the reflected rays 72 to a line focus along the length of piping 76 of the heat transfer means. It is important to note that the reflected rays 72 remain parallel as long as the focal axis 66 is positioned at precisely the half angle between the sun and the receiver 68 as established in my prior patent.

Figure 5:
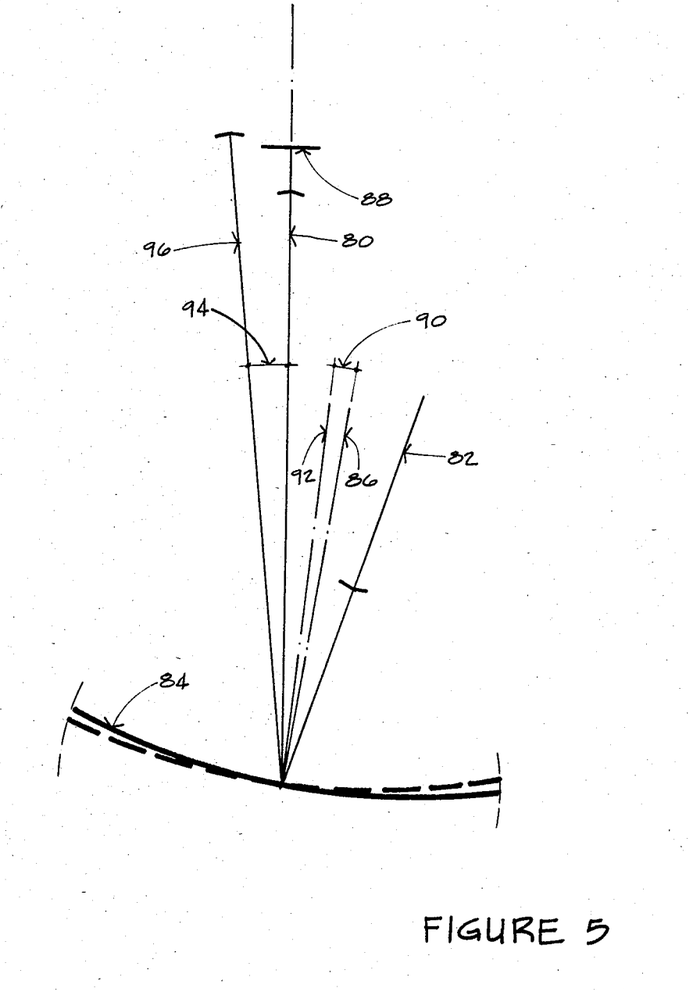
FIG. 5 is a diagrammatic illustration of the effects of tracking alignment errors on the pattern of reflected rays from aspheric, nonparabolic reflectors at the receiver.

As illustrated in FIG. 5, tracking alignment errors result in a compound angular deviation of the reflected rays. Reflected ray 80 is in the optically correct angle of reflection for incident ray 82 upon reflector 84 when a reflector's focal axis 86 is aligned at precisely the half angle between the sun and a receiver 88. A tracking alignment error of the reflector's focal axis 86 to focal axis 92 by an angle 90 results in a deviation 94 of the reflected ray 80 to ray angle 96 that is twice alignment error angle 90, when the reflector's pivot axis is located at the surface of the reflector 84.

Figure 6:
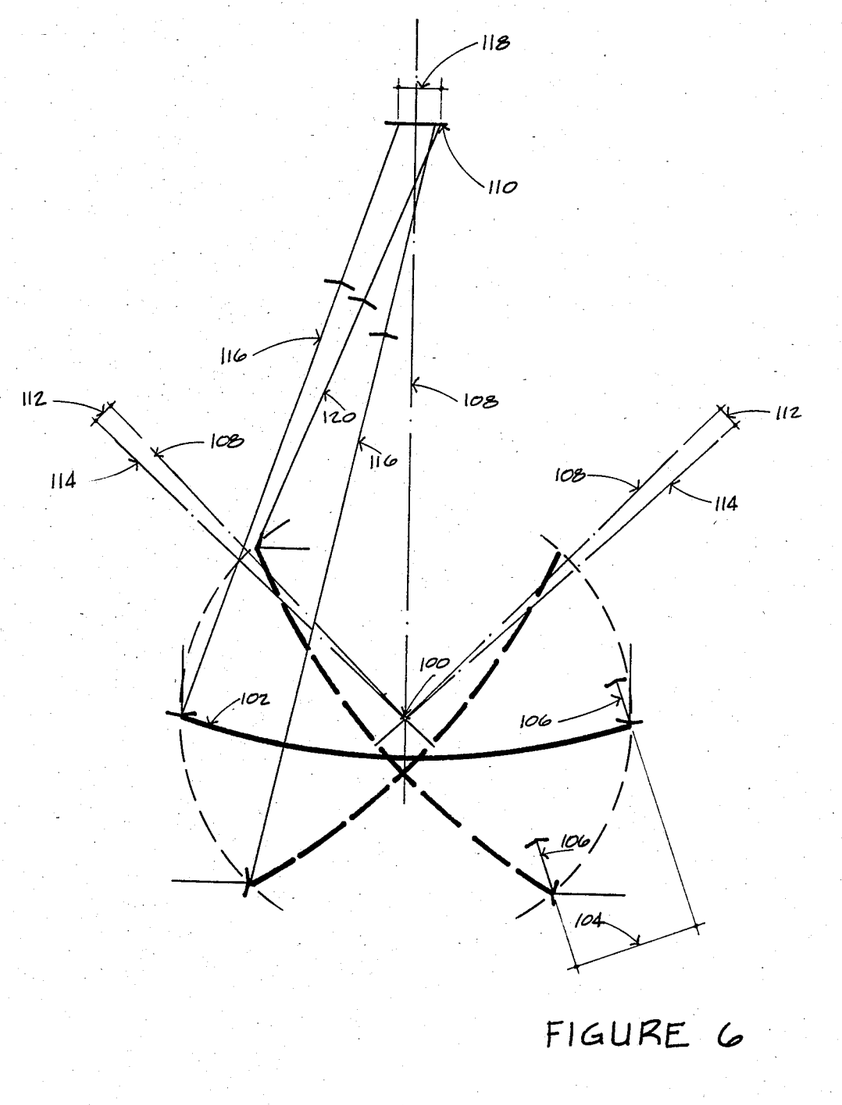
FIG. 6 is a diagrammatic illustration of the reduced width of the pattern of reflected rays at the receivers that results from skewing of the reflector's alignment in conjunction with a forward pivot axis location.

The automatic alignment adjustments of the present invention allow selection of a pivot axis location forward of the reflector's surface as illustrated in FIG. 6. Locating pivot axis 100 forward of reflector 102 would normally result in a greater width 104 of the pattern of reflected rays 106 from the edges of the reflector 102 as illustrated on the right half of FIG. 6, as the reflector 102 is rotated from left to center to right with the reflector's focal axis 108 positioned at precisely the half angle between the sun and receiver 110. Skewing the alignment of the reflector's focal axis 108 with the alignment adjustments of the present invention by a skew factor (alignment adjustment angle 112) to focal axis position 114 results in a deviation of the angle of reflected rays 116 at the left and right positions of the reflector 102 that are double the alignment adjustment angle 112, which reduces width 118 of the pattern of reflected rays 116 and 120 at the receiver 110 as illustrated on the left half of FIG. 6.

In combination, the forward pivot axes locations and the automatic alignment adjustments of the present invention allow full utilization of the reflector aperture and provide greater flexibility in the design and fabrication of the reflector support framing system. An additional advantage is that the perpendicular pivot axes may be located at or near the center of gravity of the reflector and reflector support framing assembly, thereby minimizing or eliminating the need and cost of counterbalancing means. Similarly, the north-south pivot axis may be located at or near the center of gravity of the entire torsion tube assembly, thereby minimizing or eliminating the need and cost of counterbalancing means.

Figure 7:
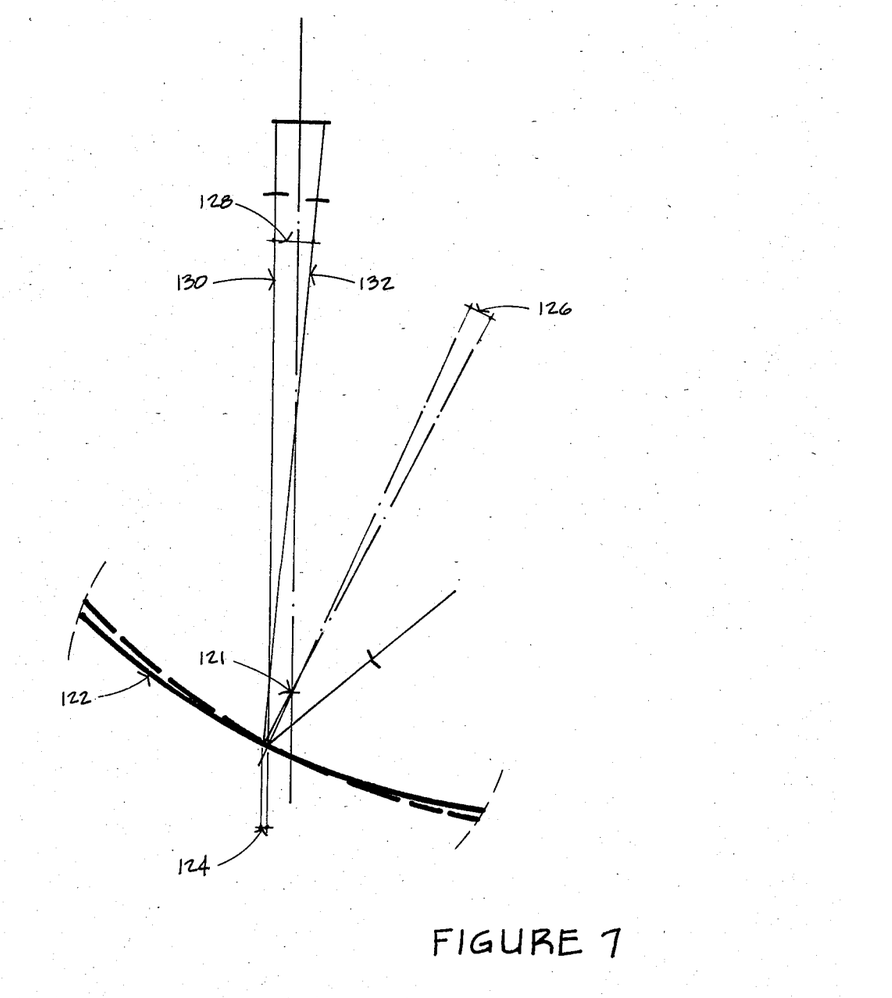
FIG. 7 is a diagrammatic illustration of the reduced width of the pattern of reflected rays at the receivers that results from skewing that reflector's alignment slightly off the half angle between the sun and the receivers to offset the effects of tracking alignment errors in conjunction with a forward pivot axis location.

The selection of a pivot axis location forward of the reflector's surface reduces the effect of angular deviations of the receiver caused by tracking alignment errors. As illustrated in FIG. 7, a forward pivot axis location 121 for reflector 122 results in a lateral shift 124 for any tracking alignment error 126, in the opposite direction of angular deviation 128 of reflected ray angle 130 to ray angle 132, thereby reducing the width of the pattern of reflected rays at receiver 134. Conversely, a pivot axis location rearward of the surface of reflector 122 would result in a lateral shift in the same direction as the deviation of the reflected ray, thereby compounding the effect of the tracking alignment error.

It is known that the annual range of north-south sun positions varies with the latitude, and that at a northern latitude the annual range of sun positions are more to the south of vertical than the annual range of sun positions at a southern latitude. One means of compensating for this variation is to design and fabricate specific reflector curvatures and reflector support framing systems for each latitude, which would increase the cost of the solar apparatus and reduce its economic advantage.

Figure 8:
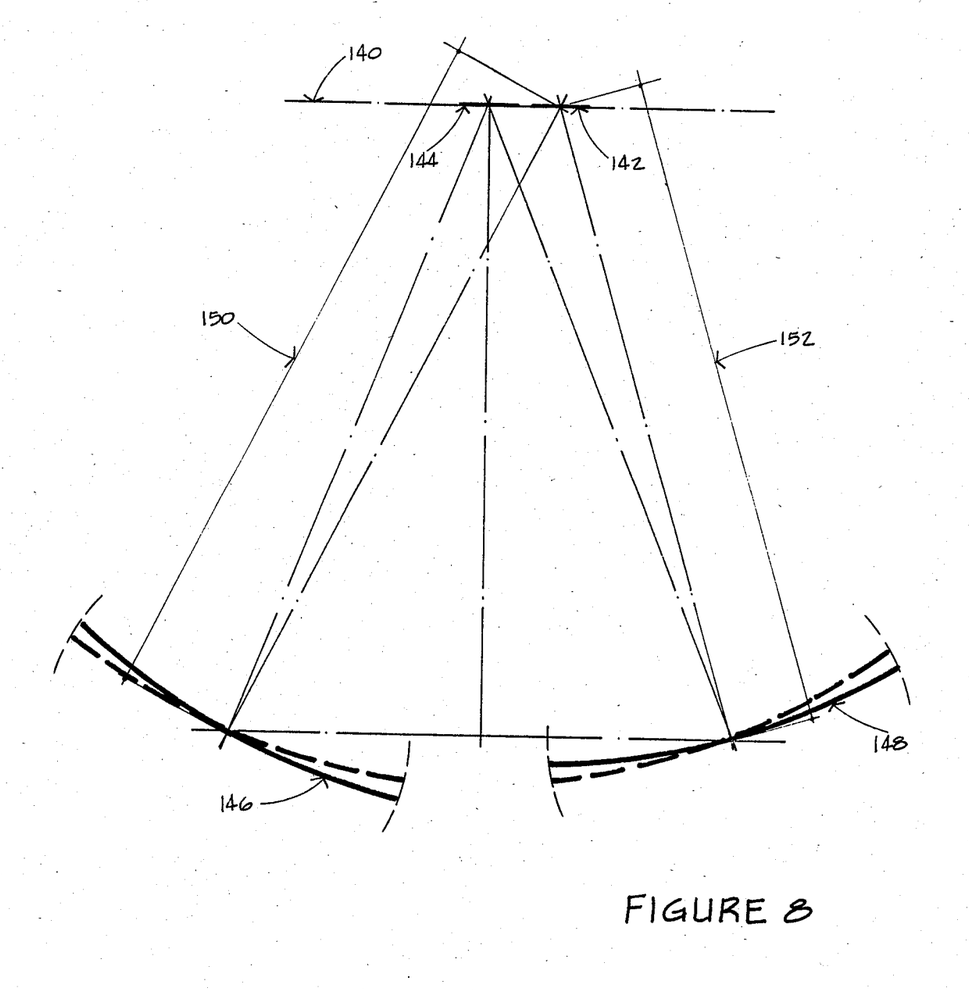
FIG. 8 is a diagrammatic illustration of the changed distance from each reflector to the receiver that results from repositioning the receiver away from the centered position between each tandem pair of reflectors.

One preferred means of compensating for the variation in the range of sun positions is to position the receivers of the solar apparatus north or south of the centered position between each tandem pair of reflectors as illustrated in FIG. 8. A receiver 142 location away from a position 144 centered between the tandem pair of reflectors 146 and 148 results in an increased distance 150 from the reflector 146 to the receiver 142 and a decreased distance 152 from the reflector 148 to the receiver 142. Since transfer means 140 includes continuous piping, receiver 142 can be located at various positions along the length of the piping without increasing the cost of the solar apparatus.

Figure 9:
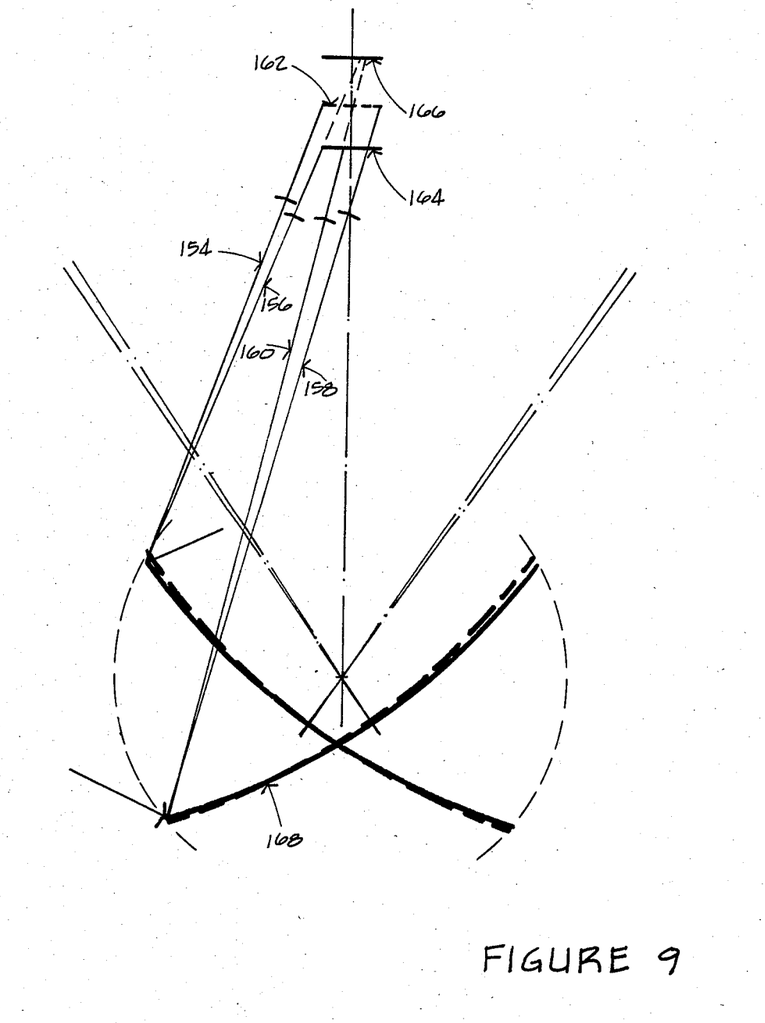
FIG. 9 is a diagrammatic illustration of the retained width of the pattern of reflected rays that results from skewing the reflector's alignment slightly off the half angle between the sun and the receivers to offset the effects of a shortened and lengthened distance between the reflector and the receiver.

As illustrated in FIG. 9, the alignment adjustments of the present invention introduce a deviation of ray 154 to ray 156 and of ray 158 to ray 160 thus causing rays 156 and 160 from reflector 168 to intercept the receiver 162 at its foreshortened position 164 within the same pattern width. The dashed extensions of rays 156 and 160 illustrate that the rays 156 and 160 also intercept the receiver 162 at its lengthened position 166 within the same pattern width. Alignment adjustments need be selected for the foreshortened position 164 only.

The diagrammatic illustrations presented in FIGS. 6, 7 and 9 are simplified presentations of the benefits of the alignment adjustments of the present invention for single points on the reflector surface in one axis of rotation only. It is known that selection of the alignment adjustments would necessitate optimization of the automatic alignment adjustments (i.e. the skew factors) over all points on the reflector's surface and for simultaneous pivoting of the refelectors about both axes for all sun positions of the year.

Skew factors may be selected for the longest and shortest days of the year, and extrapolated for all other days of the year. Separate automatic alignment adjustments (skew factors) may be selected for east-west tracking and for north-south tracking. In addition, separate skew factors for the north-south tracking may be selected for sun positions north of vertical and for sun positions south of vertical.

In the preferred embodiments, the skew factor is a percentage of the angle between the sun and the vertical axis. The automatic alignment adjustments are the same for all reflectors within a plurality of reflector and torsion tube assemblies at a common installation or latitude.

CONCLUSION

The automatic alignment adjustments of the present invention, as described above, are incorporated into the tracking control program of aspheric, nonparabolic concentrating solar collecting apparatus, allow improvements to the embodiment of the prior art, provide flexibility in the location of the reflector's pivotal axes and in the design and fabrication of the reflector's support framing system, reduce the effects of tracking alignment errors, and allow replicated reflectors and standardized reflector support framing systems to be utilized over a wide range of latitudes.

Although the present invention has been described with reference to preferred embodiments, workers skilled in the art will recognize that changes may be made in form and detail without departing from the spirit and scope of the invention.

What is claimed is:

1. A method of controlling a solar energy apparatus of a type having an aspheric non-parabolic reflector for reflecting rays from the sun, the reflector having a focal axis; a fixed position receiver for receiving reflected sun rays from the reflector; and a tracking drive for moving the reflector; the method comprising:
    determining a half-angle position of the reflector in which the focal axis is aligned generally with a half angle between the sun and the receiver;
    determining a skew factor which is a function of an angle between the sun and a vertical axis to offset effects of tracking alignment errors resulting from location of a pivot axis of the reflector;
    determining a modified position of the reflector based upon the half-angle position and the skew factor; and
    controlling the tracking drive to move the reflector to the modified position so as to maintain the focal axis aligned generally with the half angle between the sun and the receiver but with the alignment of the focal axis with the half angle being skewed by the skew factor which is a function of an angle between the sun and a vertical axis.

2. The invention of claim 1 wherein the tracking drive comprises an east-west tracking drive for moving the reflector about a north-south axis to follow east-west sun movement; and a north-south tracking drive for moving the reflector about an east-west axis to follow north-south sun movement.

3. The invention of claim 2 wherein operation of the north-south tracking drive is controlled so that the skew factor is a percentage of the angle between the sun and the vertical axis, and the percentage is a function of the day of year and whether the sun is north or south of the vertical axis.

4. The invention of claim 1 wherein the reflector is formed by a pair of spaced apart aspheric non-parabolic reflector sections; and wherein the receiver is located at a fixed position above and proximate a centerline between the pair of reflector sections.

5. A method of controlling a solar energy apparatus of a type having aspheric non-parabolic reflector for reflecting rays from the sun, the reflector having a focal axis; a fixed position receiver for receiving reflected sun rays from the reflector; and a tracking drive for moving the reflector; the method comprising:
    periodically computing a current position of the sun based upon latitude, a current day of year and a current solar time of day;
    periodically computing a skew factor based upon the angle between the current position of the sun and the vertical axis, the skew factor being an angle which is much smaller than a half angle between the sun and the receiver;
    periodically computing a desired alignment of the focal axis based upon the current position of the sun and the skew factor; and
    providing control signals to the tracking drive to cause the tracking drive means to move the reflector means to a position corresponding to the desired alignment.

6. The invention of claim 5 wherein the skew factor offsets tracking alignment errors resulting from location of a pivot axis of the reflectors.

7. The invention of claim 5 wherein the skew factor offsets effects of varying distances between portions of the reflector and the receiver.

8. A method of controlling a solar energy apparatus of a type having an aspheric non-parabolic reflector for reflecting rays from the sun, the reflector having a focal axis; a fixed position receiver for receiving reflected sun rays from the reflector; and a tracking drive for moving the reflector; the method comprising:
    determining a half-angle position of the reflector in which the focal axis is aligned generally with a half angle between the sun and the receiver;
    determining a skew factor which is a function of an angle between the sun and a vertical axis to offset effects of varying distances between portions of the reflector and the receiver;
    determining a modified position of the reflector based upon the half-angle position and the skew factor; and
    controlling the tracking drive to move the reflector to the modified position so as to maintain the focal axis aligned generally with the half angle between the sun and the receiver but with the alignment of the focal axis with the half angle being skewed by the skew factor which is a function of an angle between the sun and a vertical axis.

* * * * *